US007769840B1

United States Patent
House et al.

(10) Patent No.: US 7,769,840 B1
(45) Date of Patent: *Aug. 3, 2010

(54) NETWORK STATUS ANIMATION TOOL

(75) Inventors: Ronald Louis House, Overland Park, KS (US); Joe B. Quint, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1052 days.

This patent is subject to a terminal disclaimer.

(21) Appl. No.: 11/350,056

(22) Filed: Feb. 8, 2006

Related U.S. Application Data (63) Continuation-in-part of application No. 10/993,178, filed on Nov. 19, 2004, now Pat. No. 7,126,466.

(51) Int. Cl.
    *G06F 15/173* (2006.01)
(52) U.S. Cl. .................. 709/223; 340/507; 345/473
(58) Field of Classification Search .................. 709/223; 340/507; 345/473
    See application file for complete search history.

(56) References Cited

U.S. PATENT DOCUMENTS

| 6,356,758 | B1* | 3/2002 | Almeida et al. ............. 455/446 |
| 6,628,304 | B2* | 9/2003 | Mitchell et al. ............. 715/734 |
| 2001/0035885 | A1* | 11/2001 | Iron et al. .................... 345/855 |
| 2002/0101431 | A1* | 8/2002 | Forney et al. ............... 345/582 |
| 2002/0127993 | A1* | 9/2002 | Zappala ...................... 455/404 |
| 2003/0023747 | A1* | 1/2003 | Fouquet et al. ............. 709/238 |
| 2004/0061701 | A1* | 4/2004 | Arquie et al. ............... 345/440 |
| 2004/0222992 | A1* | 11/2004 | Calkins et al. ............. 345/473 |
| 2005/0223264 | A1* | 10/2005 | Arden et al. ................. 714/4 |
| 2005/0257204 | A1* | 11/2005 | Bryant et al. ............... 717/163 |

\* cited by examiner

*Primary Examiner*—Thu Nguyen
*Assistant Examiner*—Thomas J Dailey (57) ABSTRACT

A web-based geographic network status tool uses an animation process that sequentially displays web pages, one after the other. Each page reflects the status of the network for a different time block. The animation optionally includes two layers. One layer shows which elements (towers) are faulty and why (e.g., subject to power failure, undergoing software or hardware problems, transport problems). The other layer displays if the problem has been perpetuated for more than one time block.

20 Claims, 10 Drawing Sheets

NETWORK STATUS ANIMATION TOOL

CROSS-REFERENCE TO RELATED APPLICATIONS

This application is a continuation-in-part of prior application Ser. No. 10/993,178, filed Nov. 19, 2004.

STATEMENT REGARDING FEDERALLY SPONSORED RESEARCH OR DEVELOPMENT

None.

BACKGROUND OF THE INVENTION

1. Field of the Invention

The present invention relates generally to the field of managing telecommunications networks. More specifically, the invention is directed to the field of analyzing wireless network outage information.

2. Description of the Related Art

Wireless telecommunications service providers typically manage complex wireless networks (e.g., CDMA networks). The overall network is geographically divided into coverage areas commonly referred to as "cells." Each cell is wirelessly serviced by a particular tower located in that cell. The cell perimeters are normally irregularly shaped. This is because the distance for coverage for a specific tower will vary depending on terrain, tower effectiveness, as well as other factors. Because of this, an overall map of the entire network will resemble a puzzle, the coverage cells being the pieces.

When such a system is engaged by destructive forces, e.g., weather, power surges, or acts of terrorism, network administrators often need information regarding the functionality of the various cells in the network. Sometimes the information is retrieved in real time. This is necessary so that the user may assess the current condition of the network and its many elements (cells). Other times, the information needed is historical in nature. This information is used to determine in hindsight what the causes for system failures were, and possibly use this information to prevent reoccurrence.

Using conventional systems and methods, these assessments are tedious and otherwise difficult. They involve assimilating all of the tickets which the user deems relevant to the event. Tickets are error messages which are created to provide some indication of a change of status or network problem. In the context of a wireless network, each ticket will be received regarding a cell functionality issue. For example, the ticket might indicate that the tower serving the cell has lost power. The ticket may be generated by a human, or automatically by a computing device or system.

The occurrence of a major network event, e.g., a hurricane, will result in the generation of numerous tickets being transmitted at numerous intervals as the storm moves through a coverage area. To manage this flood of ticket information, either in real time, or historically is quite a chore. If the interested party wishes to analyze the hour-by-hour effects of the storm, they will have to access all of the tickets generated from each cell in each hour. The times and cells involved must be kept straight to ensure accurate record generation. If this process is repeated for, e.g., every hour of a two day storm, the significant data collected is difficult to assimilate into a useable medium. Maps may be manually generated, but this process is slow, prone to error, and usually too slow to allow for any real-time application. Patterns are difficult to recognize because there is no user friendly format to make an hour-by-hour comparison fruitful.

Additionally, by the time the user has assembled current ticket information and created some means of comparison to the earlier hourly ticket information, the current information may become stale because of the delay.

Thus, there is a need in the art for a system and method which enables the user to quickly manipulate assembled ticket information for real time and historical purposes.

SUMMARY OF THE INVENTION

The system and method of the present invention overcome these disadvantages by creating a network tool which geographically presents network elemental status in animated form. The system comprises a database having a first interface for periodically receiving status information regarding a plurality of distinctly located network elements from a human or automated client in order to maintain a historical record of the status of said plurality of distinctly located network elements. The database includes a second interface which enables a user to access status information for a plurality of instances in the historical record. Also included is a geographical viewer. The geographical viewer uses the instances accessed to create a graphical animation which sequentially displays each instance.

BRIEF DESCRIPTION OF THE SEVERAL VIEWS OF THE DRAWINGS

The present invention is described in detail below with reference to the attached drawing figures, wherein:

FIG. 7 also shows three new tool buttons that may be adopted by a web browser that runs the application of the alternative embodiment of the present invention.

DETAILED DESCRIPTION OF THE INVENTION

The present invention provides a system and method for creating a geographic network status animation. The animation process involves a sequential display of web pages, one after the other. Each page reflects the status of the network at a different time. The animation includes two layers. One layer shows which elements (towers) are faulty and why (e.g., subject to power failure, undergoing software or hardware problems, transport problems). The other layer displays if the problem has been perpetuated for more than one time block, e.g., existed for more than 4 hours. Either one of the two layers may be selected alone, or both may be displayed at the same time.

Various technical terms are used throughout this description. These definitions are intended to provide a clearer understanding of the ideas disclosed herein but are in no way intended to limit the scope of the present invention. The definitions and terms should be interpreted broadly and liberally to the extent allowed the meaning of the words offered in the above-cited reference. For example, whereas some distinguish the World Wide Web (WWW) as a subcomponent of the Internet, "web"—as used herein—should not be construed as limited to the WWW. Rather, "web" is intended to refer generally to the Internet and/or is related subnetworks and subcomponents.

As one skilled in the art will appreciate, the present invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Combinations of the above are included within the scope of computer-readable media.

Figure 1:
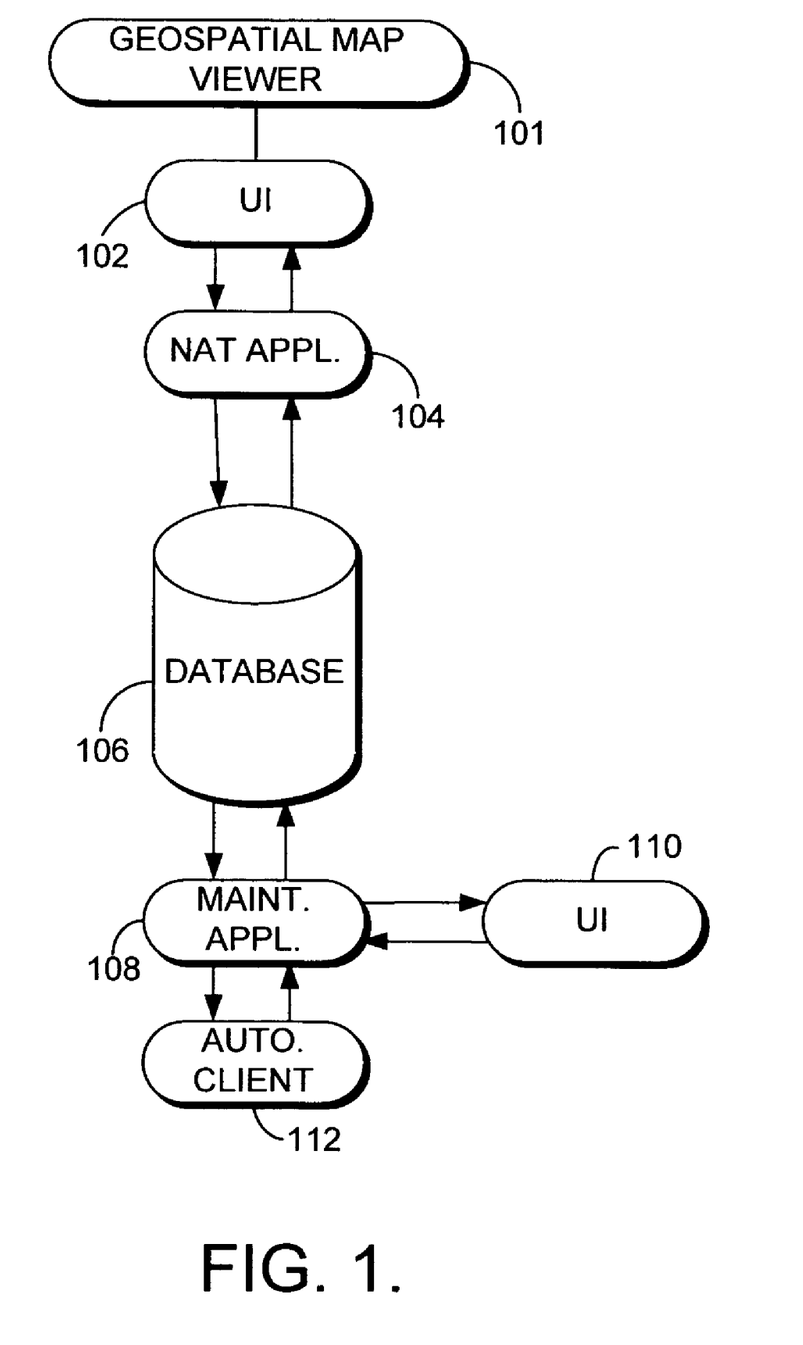
FIG. 1 is a schematic diagram showing one environment in which the system and method of the present invention may exist.

One embodiment for an environment in which the system and methods of the present invention may exist is disclosed in FIG. 1. Referring to the figure, we see that the system includes a database 106. Network status information will be gleaned from database 106 using a geospatial map viewer plug-in 101 through a user interface 102. A geospatial plugin is a commercially available software program which are loaded onto a PC, laptop, or other workstation to work with web applications and enable the user to access map information over the web to generate network status animations as will be discussed hereinafter. User interface 102 is a graphical user interface, or other known sort of interface accessed over the web, an intranet, or possibly even some sort of LAN. With the preferred embodiment, however, the interfacing takes place over the web.

Most of the processes of the present invention occur using a network animation tool (NAT) 104 which is a software application. This application may be running on an application server, e.g., an Apache server, or some other kind of web server. NAT application 104 will access network status data in database 106 as needed.

The other side of FIG. 1 includes the systems used to generate the wireless network status information in database 106 which will be used to generate the graphical animation. A maintenance application 108 is used to manage status tickets. A ticket typically includes a date and time at which the ticket was transmitted. Also part of the ticket is a Base Transceiver Station (BTS) number, and a switch identifier. These features together identify the particular cell to which the ticket pertains. The ticket will also include information regarding the reason for failure of the tower.

Tickets come from one of two sources. The most common source is from an automated client 112. Automated clients like client 112 will be well known to those skilled in the art. This type of client might include software applications which monitor the status of a geographical cell. Automated clients such as these automatically generate tickets which electronically convey in an email a substantive explanation for the problem encountered. If no specific problem is ascertainable, the ticket may indicate that the cause is unknown. The second source of tickets that might be received is from a human client directly through a user interface 110. For example, a systems administrator might manually generate an email. This email would be received by the maintenance application 108. This email, like the email generated by the automated process, will include the substantive reason for the network failure in the cell.

Upon receipt of the status information from one of human client 110 or automated client 112, application 108 will cause that information to be maintained in database 106. From database 106, the information may be accessed by NAT application 104. In one embodiment, NAT application 104 accesses the ticket information on command, or as a matter of a routine running in the NAT application. In another embodiment, NAT application 104 is made synchronous with maintenance application 108. In the synchronous embodiment, maintenance application 108 communicates with NAT application 104 and arranges simultaneous transmission of the ticket information across database 106 without any prompting. This enables the information to be immediately received by NAT application 104 for continuous live map viewing through web browser interface 102.

With either the synchronous or nonsynchronous arrangements, the BTS number and switch identifier of the ticket will be used to match the failure information with the appropriate geographical cell shown in the map created by the geospatial map viewer 101.

Figure 2:
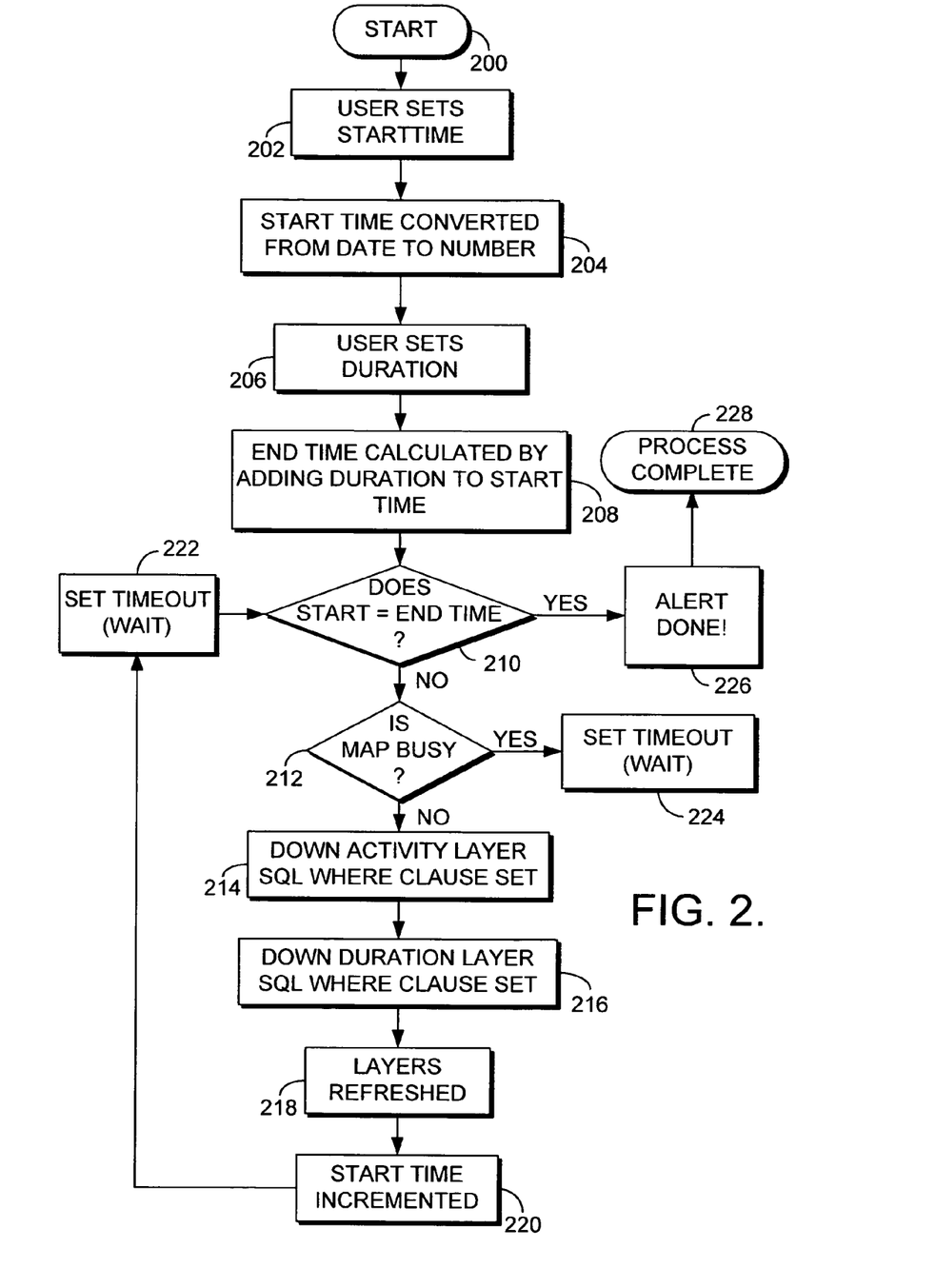
FIG. 2 is a flow chart showing the basic steps of one embodiment of the present invention.
Figure 3:
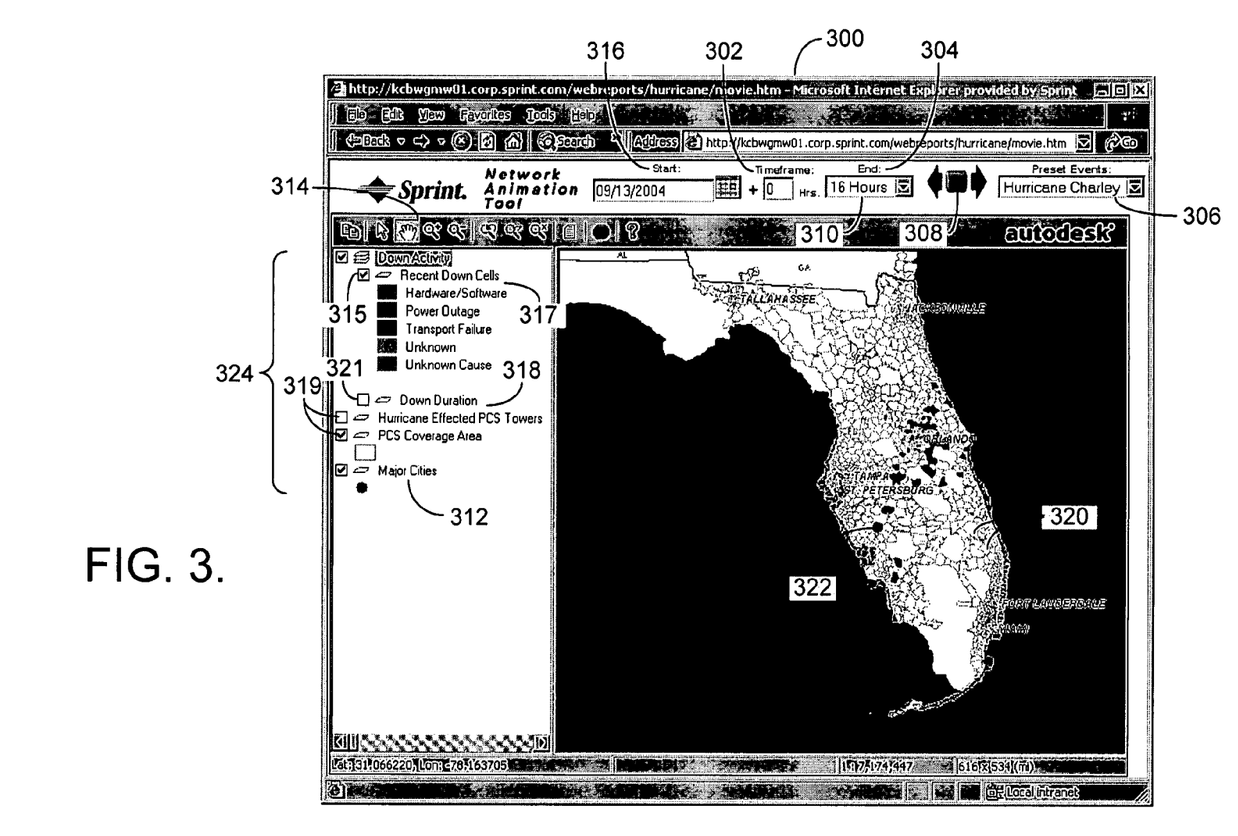
FIG. 3 is a screen shot for one instance being displayed for a user for one embodiment of the present invention.

A more specific representation of the processes running on NAT server 104 may be seen in FIG. 2. The process is kicked off using a start command at a step 200. This is accomplished over the web. To do so, the user will have already brought up NAT application 104 by entering the IP address for the application in the user's web browser (here, user interface 102). Once the application has been brought up, it is likely that the application will have typical security screens in place requiring the entry of a username, password, and any other security-access required information the administrator sees important to protect the proprietary NAT application and the network status information which is stored in database 106. Once these security procedures have been completed, the user will see a screen 300 in his or her web browser as shown in FIG. 3. Web page 300 in FIG. 3 will be referred to along with FIG. 2 to fully understand the step by step process.

In a next step 202 the user sets a start time. The start time will mark the beginning time for the animation which will be created. This start time is selected from a drop down menu 316. Drop down menu 316 enables the user to select from a variety of dates and times in a manner which will be known to those skilled in the art. In the instance the network event was, e.g., a hurricane, the user might select a start time which immediately precedes the arrival of the hurricane. Thus, the effect of the hurricane on the cells in the network may be observed.

NAT application 104 will already have associated with it a particular monitoring time block. In the disclosed embodiment, this time block is 4 hours. The time block is the increment at which the animation process will be run. In other words, each frame in the animation process will represent the status of the cells at one instance every four hours. In the disclosed embodiment, this time block is a preset constant. One skilled in the art, however, will recognize that it could be reset easily by a systems administrator, or other user. It is also possible that web browser screen 300 could provide the user means to change the time block increment (via field or drop down menu). Here, however, the time block (4 hours) has been preset at a value selected to best reflect by animation the effects of the event, e.g., hurricane.

Once a start time has been selected, in a step 204 NAT application 104 converts the start time selected from drop down menu 316 from a date to a number. The reason for this conversion is that a number will be more useable for querying the database 106 for ticket/status information regarding the particular network elements (towers). This is because the dates are in string format. With the time included, this makes the combination difficult to search for. By using a number to represent both date and time, querying is thus made easier. The way this has been accomplished in the present embodiment is to use the hour of the year to represent the date and time. Per this process, the minutes are truncated. A military 24 hour clock is used to come up with the hour of the date selected. This is then added to the hours already expired that year. Using the date shown in FIG. 3 as an example, we would first calculate the hours. The time shown is 11:03 PM. Converting this to military time (23:03) and then truncating we come up with 23 hours that day. Then, using the Aug. 13, 2004 date, the total number of days already having occurred would be 225 days. Multiplying by 24 to get the number of hours for days already occurred that year, we get 5400 hours. Thus, the number generated by the NAT application to identify 11:03 PM on Aug. 13, 2004 would be 5400 hours+23 hours=hour number 5423. The NAT application will use this hour number in processing the start time, and in other processes.

Now that the start time (hour number 5423) is expressed in a manner useable to the application, in a step 206 the user will set an animation duration using drop down menu 304. The drop down menu 304 includes a period of time (e.g., "1 day" is shown in FIG. 3) that is a multiple of the incrementing time block (4 hours) of the NAT application. For example, where the time block is 4 hours, the possible ending time frames might be 0 hours (for a start-time display only), 4 hours, 8 hours, 16 hours, 1 day, 2 days, 3 days, 1 week, etc. Other end times could be provided as well, so long as they are consistent with the time block increment selected.

Once this end time is selected in step 206, the NAT application calculates the end time. This is done by simply adding the hours included in the duration entered by a user to the hour identifier for the start time already selected. Here, the selection of 1 day for the duration would result in an end time number of 5447, which is calculated by the NAT application by adding 24 hours to the start time hour number 5423. Thus, the end time would be identified by the application as hour number 5447.

Next, in a step 210 the NAT process determines if the start time number (now 5423) is equal to the end time number (now 5447). Since that is not yet the case, the process will move on to a step number 212. This is a simple wait process. It is designed to ensure that all map-generating processes of the geospatial map viewer 101 have completed before a new map is generated. If the mapping processes are not complete, the process will set and wait for a time out in a step 224. The time out step will cause the process to wait for a short increment, then return to the step 212 to again ascertain whether the mapping processes for the last generation have completed.

Once all the mapping processes are complete, the process moves on to a step 214 in which the NAT process 104 queries database 106 for down cell activity information. This query will cause all the nonfunctioning cells for the particular interval to be recognized by the map viewer 101. This is done using an SQL whereclause set. The query limits the collected data to only include status information regarding which cells are down (nonfunctional) for the time period of the current 4 hour increment up in the process. Of the status information retrieved, the NAT application will assign a particular color code or shading (recognizable by map viewer 101) for each of a variety of different problems. For example, the occurrence of a software or hardware problem could be indicated in red. A power outage could be shown as gray. Transport failures could be shown in green. You could even provide a cooler code for situations where a ticket does not make it clear whether a cell is functional or not, or where it is determined that the cell is down, but the precise cause of the inoperability is unknown.

The information extracted from the database as the result of the query step 214 will be only a fraction of the total ticket information maintained in database 106 by the maintenance application 108. The only information queried will be that regarding the increments selected and for the status characteristics sought (e.g., the cells that are down, and the reason for the outage).

Because geospatial map viewer 101 will not recognize the BTS and switch information included in the ticket information queried, the NAT application 104 takes the ticket BTS number and switch identifier and locates an appropriate cascade ID using a look up table. The geospatial map viewer will have a particular geographic plot on the map designated to a particular cascade ID. The application uses the look up table to translate the ticket BTS and switch information, which is not identifiable by viewer 101, to an appropriate cascade ID that is recognized by map viewer 101. This enables the proper cell shading and color coding being made on the map that is to be generated.

Thus, in step a first layer of map information is generated which includes (i) geographic representations of all of the cells on the grid which are down, and (ii) a color identification for each of these down cells as to just what the problem is.

The process, in a next step 216, also includes the creation of a second layer. A layer is two items on the same geographical map, one superimposed on top of the other. Here, the second layer will include down duration information—or in other words—an indication of which of the down cells were also down in the last 4 hour time block.

Step 216 is accomplished by the NAT process using another SQL where clause set. This query limits the collected data to include status information regarding which cells are down at the current 4 hour time block interval which were also down in the 4 hour time block immediately preceding—an indication of a continued problem. Once it is determined which cells apply, NAT application 104 will assign a particular color or shading. The color or shading selected should be one which is easily distinguishable from the other colors selected in step 214 to prevent confusion when the two layers are superimposed one on the other by the map viewer 101.

Again, because geospatial map viewer 101 will not recognize the BTS and switch information included in the ticket information queried, the NAT application 104 converts these for each cell to a cascade ID which enables the map viewer to color or shade the appropriate cells as being ones which have been down for significant duration (for at least more than one 4 hour time block).

Once the NAT application assimilates the information necessary to generate both layers in steps 214 and 216, the layers are displayed to refresh the map maintained on viewer 101 appearing as shown in FIG. 3. As seen in the figure, the map generated will show a number of cells 320 which are not colored or shaded at all. The map will also show another group of cells 322 which are shaded or colored. Where one of the cells was disabled for more than one time block (identified as a problem of continued durational problem in step 216), that cell will have its original (first layer) coloring superimposed with a second color or shading of the second layer.

After the map has been generated including both layers, the start time will be incremented in a step 220. For the first time through the map generation process, this would mean that the NAT application will cause 4 hours to be added to the 5223-hour start time, thus causing the next data collection queries (as will be discussed later) to run for hour number 5227.

In a next step 222, a timeout is instituted by the process. This time out may be preset in the application at some time (e.g., 3 seconds) enabling the user to adequately observe map trends and status between increments. Alternatively, it could be set by the user through the web browser interface 300 as shown at drop down menu 310. This drop down menu 310 will likely be set up with an automatic default to a particular increment (e.g., 3 seconds) which may be optionally changed by the user. Regardless, the time for the delay should be set at a level which will adequately delay the looping process in order for the map viewer to properly process the data and still allow for enough user viewing time.

After this, the process returns to step 210 and asks whether the start time (now incremented to hour number 5227) is equal to the established end time (hour number 5447). Because this is not yet true, the process will continue again through steps 214, 216, and 218, generating a newly generated map conveying the down activity and down duration information for the next four hour block (represented as hour 5227).

After this occurs, the start time will again be incremented in step 220 adding another four hours to 5227 to equal 5231. Step 222 will then pause the process for the 3 second delay selected (or defaulted to) in dropdown menu 310 and return the process to step 210.

This looping of the process through steps 214, 216, 218, 220, and 222 (and step 224 if necessary) will continue until the start time value equals the end time value of 5447. At each 4 hour increment, the layers will be displayed for the viewer. When the end time is reached, step 210 will in a step 226 notify the user through his or her web browser 102 that the process has been completed in a step 228.

The effect of the repeated loop involving steps 214, 216, 218, 220, and 222 is that of a series of map-web screens—appearing one after the other with a short delay between each refresh—creates a highly useful animation. This animation can be used for historical purposes to determine what went wrong with certain parts of a wireless network due to a destructive event. The information may also be used for network forecasting with respect to such events.

Other features may be added to further enhance the process. As can be seen in FIG. 3, the web browser might be adapted to include a forward and back toggle arrangement 308. One skilled in the art will know that the application of the present invention could be adapted to enable the user to use toggle arrows to advance reverse animations forward or back in time in time block increments (plus or minus 4 hours in the embodiment described above).

Another optional feature shown in the FIG. 3 embodiment is that of a preset event dropdown menu 306. This menu would be set up with the presets already in place for a specific event. This would be most useful for an event which is likely to generate recurring user interest, for example, a particular hurricane. In such a case, it would be inconvenient for multiple users to continually recall and then enter the most appropriate start and end time parameters. To alleviate this, the NAT application is adapted to, after receiving the start time, duration, and delay information for an event of interest, to save these parameters and present the event in dropdown menu 306. Once the parameters are saved and the event included in the list of items in menu 306, the selection of that event from the menu 306 will result in the parameters automatically being entered into the start date menu 316, duration menu 304, and delay menu 310 boxes. Conventional software will enable one skilled in the art to program NAT application 104 to do this. This enables the same event animation to be run over and over again at different times by different users. For example, users interested in seeing the animation of Hurricane Charley would be able to rerun the same animation by selecting that event from the drop down.

Web browser 300 has also been adapted to include a plurality of map navigational tools 314. These tools are used to define the geographic area surrounding a network event. They may also be used to zoom in or out to focus on desired areas. Conventional software will enable one skilled in the art to program NAT application 104 to do this.

Also included is a map legend 324. Legend 324 includes optional selections which will determine the scope of information subject to queries 214 and 216. With a down cell selection box 315, the NAT application will be set to display (in color coding) the downed cells. Beneath this box, a legend of color code indications 317 is provided to help the map user to determine particular failure causes from the colors of the downed cells appearing on the map.

A next box 321, if checked will cause the down-duration cells to be presented and superimposed on the map. In the FIG. 2 process discussed above, it was presumed that these boxes 315 and 321 were selected. It can, however, be seen from FIG. 3 that by not checking box 321, that the down-duration information (regarding the cells down for more than 4 hours) would not be shown on the map, and that step 216 in the process would not occur at all. Similarly, by not checking box 315, but leaving box 321 checked, the animation generated would only include the down-duration information. In this circumstance, step 214 would be eliminated from the FIG. 2 process, but step 216 would remain.

A couple of other boxes 319 in legend 324 enable the user to specify, e.g., only the cells effected by a specific event (e.g., hurricane Charley) or limit the map generated to only particular coverage areas (e.g., only those enlisting a particular kind of wireless networking protocol or type).

Figure 4:
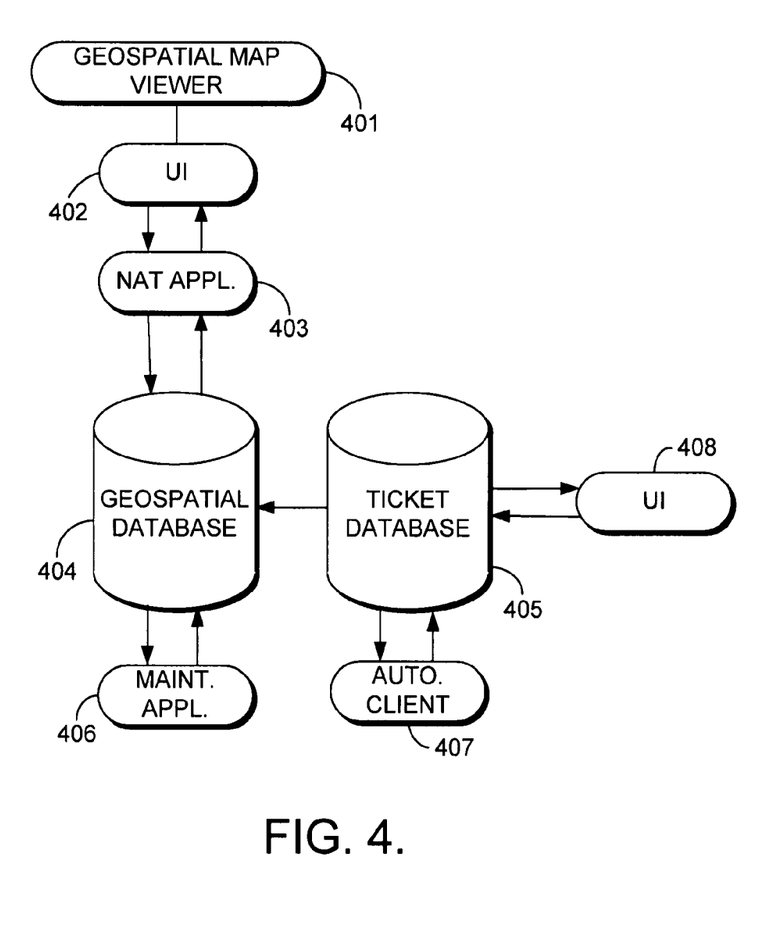
FIG. 4 is a schematic diagram showing an alternative environment in which the systems and methods of the present invention may exist.

Another embodiment for an environment in which the systems and methods of the present invention may exist is disclosed in FIG. 4. The embodiment includes two databases 404 and 405. Geospatial database 404 contains polygons that may be, but not limited to, communication cells that a communication service provider may establish for its communication networks. Someone of ordinary skill in the art will appreciate that the polygons may be any type of geographical areas that such communication service provider may define as basic units of its service coverage area. Trouble ticket database 405 is a relational database that contains network status information that may be associated with each of the polygons that are stored in the geospatial database 404.

The network status information may be gathered from entities such as communication devices and structures. Such devices and structures may include, but not limited to, communication towers and switches that the communication towers home into. The trouble ticket database 405 may be a secondary database that is linked to the geospatial database 404 by one or more common database table entries (e.g., table columns). For instance, the geospatial database 404 may be linked to the trouble ticket database 405 using cascade ID, which is a unique ID for each of the communication towers.

Advantageously, separating the geospatial database 404 and the trouble ticket database 405 provides the real-time update and display capacity of the embodiment. The separation also enables more dynamic expansion of the network status information that may be associated with each of the polygons. Another advantage is that additional information that pertains to each of the polygons may be added more readily without having to make changes to the remaining parts of the embodiment. For instance, information that pertains to available backup resources for each of the polygons may be added to the trouble ticket database 405 without affecting the integrity and operation of the geospatial database 404.

Automated clients like auto client 407 monitor the status of the service coverage areas that are associated with the polygons and automatically generate entries in the trouble ticket database 405 in real time when they sense equipment or other communication failures. A human client may also generate entries in the trouble ticket database 405 in real time through a user interface 408, which may be any suitable method or technology available for such interface. For instance, a system administrator may manually enter a trouble ticket report into the trouble ticket database 405. The network status information will be queried from the two databases 404 and 405 using a geospatial map viewer 401 through a user interface 402. The geospatial map viewer 401 enables a user to access map information over the web to generate the animation of changing network status information in real time. The user interface 402 may be a graphical user interface, and the interfacing may take place over the web. Most of the processing by the embodiment take place within a network animation tool (NAT) application 403 that may run on an application server or a web server. The NAT application 403 queries the two databases 404 and 405 to acquire the network status information that pertains to a specific part of the service coverage areas of the user's interest. A maintenance application 406 maintains the geospatial database 404.

Figure 5:
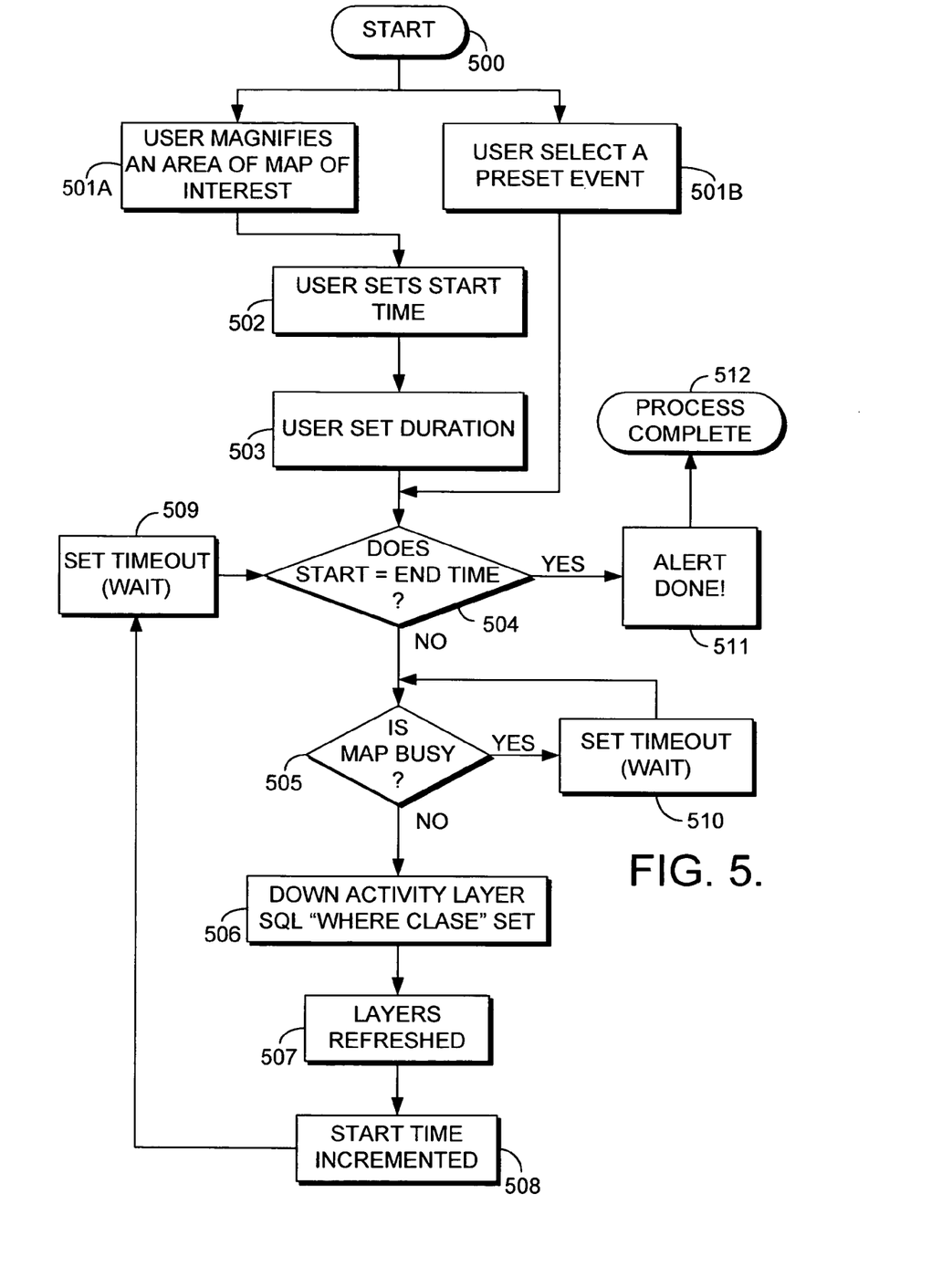
FIG. 5 is a flow chart showing the basic steps of the alternative embodiment of the present invention.
Figure 6:
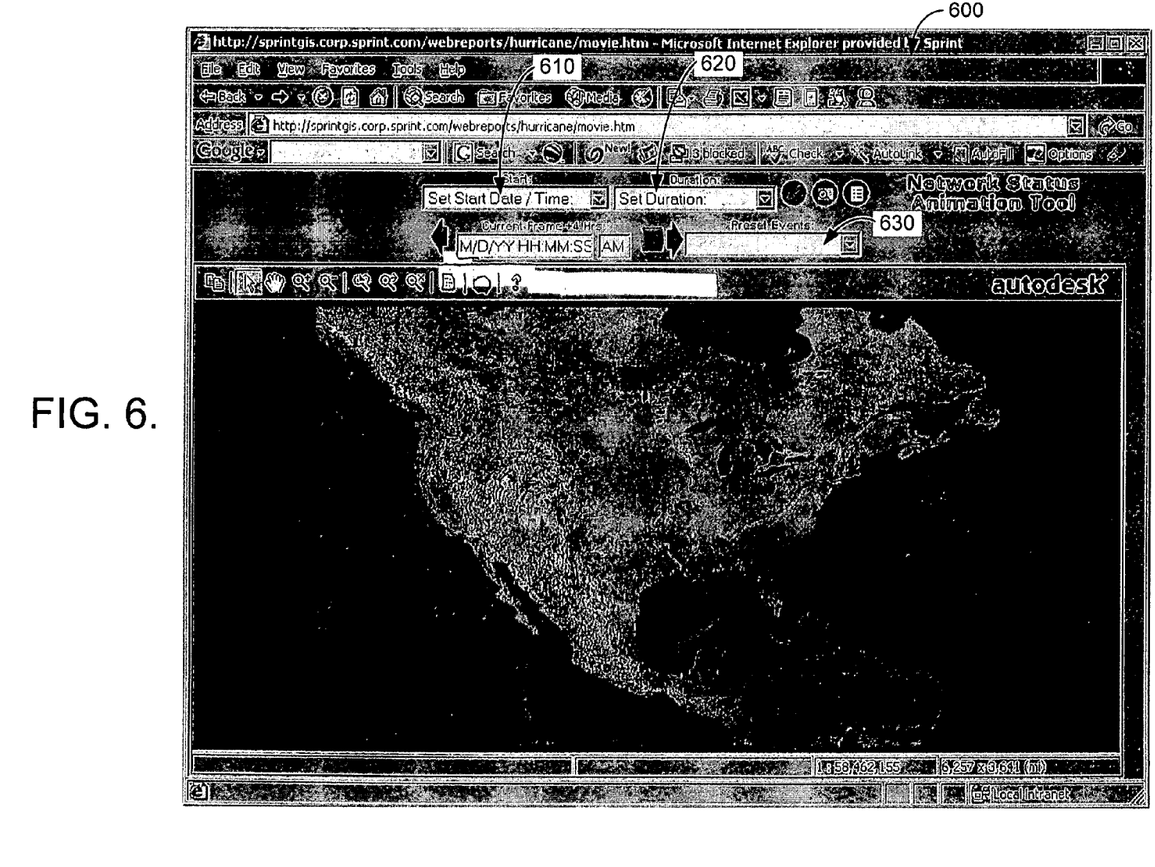
FIG. 6 is a screen shot for one instance being displayed for a user when the user starts running the application that represents the alternative embodiment of the present invention.
Figure 7:
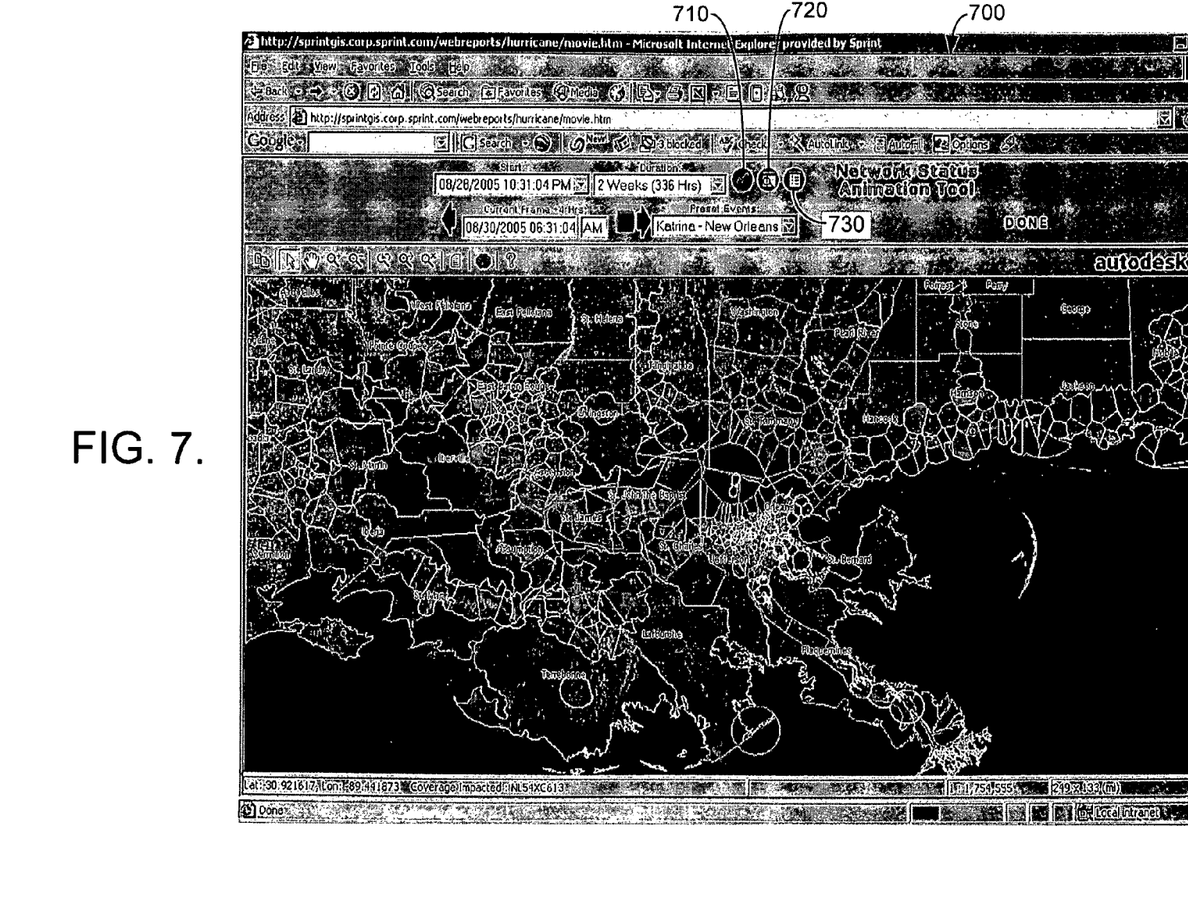
FIG. 7 is a screen shot for one instance being displayed for a user when the user zooms down to a specific area of interest.

FIG. 5 shows the basic steps of the mapping process that runs on the NAT application 403. FIG. 6 and FIG. 7 will be referred to along with FIG. 5 to fully explain the steps shown in FIG. 5. The process starts at step 500 when a user starts the NAT application 403. For instance, the user may enter an IP address for the NAT application 403 in the user's web browser. Once the user starts the NAT application 403, the user may have to pass a security measure that is mustered to prevent an unauthorized person from gaining access to the proprietary network status information. Once the user clears the security requirement, the user will see an initial screen 600 in the user's web browser as shown in FIG. 6.

From the initial screen 600, the user may proceed by choosing one of two options. The user may choose to zoom into a more specific area of interest in step 501A. Once zoomed into the more specific area, the user will see a screen that will look much like a screen 700 as shown in FIG. 7. Next, in step 502, the user may set a start time from a drop down menu 610. The start time marks the beginning time for an animated mapping process that will be created. The NAT application 403 may already have a preset constant time block, which is the increment at which the animated mapping process will run. The preset constant time block, which could be easily reset, for the embodiment is set at 4 hours for each block. In step 503, the user may set a duration for which the animated mapping process would run from a dropdown menu 620. The NAT application 403 then calculates the ending time of the animated mapping process by adding the duration to the start time.

Alternatively, the user may also choose to run a preset event from a dropdown menu 630 that is shown in FIG. 6. The NAT application 403 is adapted to save the event animation of a specific prior event that starts at a particular start time for a fixed duration. Once the specific prior event is saved along with the start time and duration and included in the list of items in the dropdown menu 630, the NAT application 403 can run its event animation automatically when the user chooses the specific event from the dropdown menu 630.

Next, in step 504, the mapping process determines if the start time is equal to the end time. If that is not the case, the mapping process will move on to the next step. Next, in step 505, the mapping process determines whether the geospatial map viewer 401 is busy. If the geospatial map viewer 401 is busy, then the mapping process waits for a short time period in step 510 before returning to the step 505 for another inquiry of the status of the geospatial map viewer 401. If the geospatial map viewer 401 is not busy, then the mapping process queries the two databases 404 and 405 in step 506 and updates the display of the geospatial map viewer 401 in step 507. The service coverage area that the user zoomed in will reflect changes that have occurred within the time block. For instance, the zoomed-in service coverage area may be painted with different colors that may indicate whether there was any communication failure and, if any, the cause of the indicated failure.

Next, in step 508, the start time is incremented by the preset constant time block. Next, in step 509, the mapping process waits for a preset amount of time for the user to adequately observe the changing network status between increments. The mapping process will loop through the steps between the step 504 and the step 509 until the start time will increment to be equal to the end time. When the end time is reached, the mapping process will notify the user through the user's web browser that the mapping process has been completed in step 511. Next, in step 512, the mapping process will come to rest.

FIG. 7 also shows three new tool buttons that may be adopted by a user's web browser. The three buttons are Find Current Fault button 710, Locate Map Object button 720, and View Legend button 730. FIG. 6 and FIGS. 8-10 each shows a web browser that has adopted the three buttons.

Figure 8:
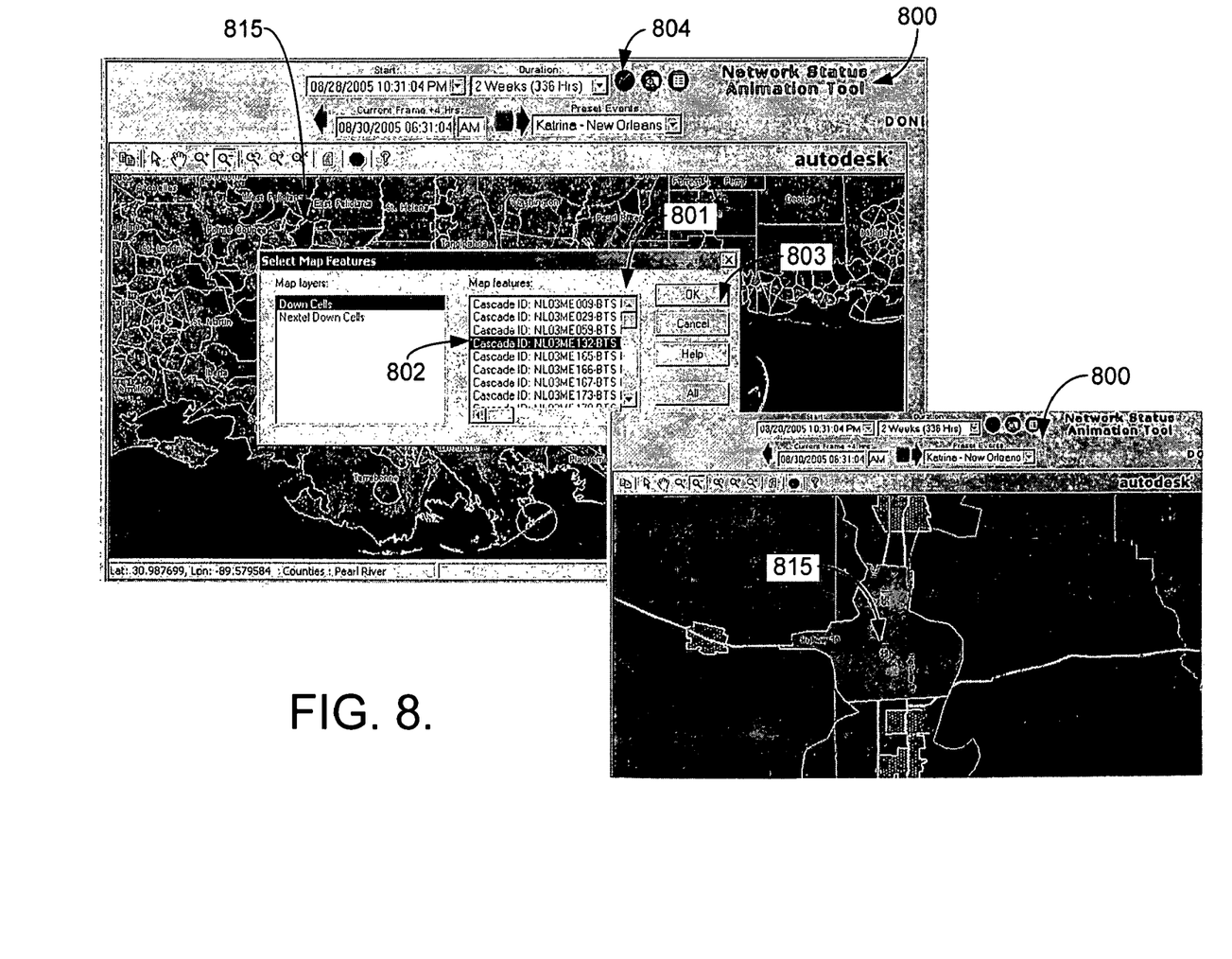
FIG. 8 is a screen shot for a dialog window that appears when a user presses "Find Current Fault" tool button.

FIG. 8 illustrates how the Find Current Fault tool button 804 may help a user obtain detailed information about a specific equipment or service coverage area that is experiencing a failure. After zooming into a more specific area of interest as shown in screen 800, a user may wish to zoom further into an even more detailed area where one or more failures have been reported to have occurred. For instance, if the user is interested in a specific equipment failure such as a downed communication tower, the user may press the Find Current Fault button 804. When the user presses the button, a Select Map Features dialog window 801 pops up. The Select Map Features dialog window 801 contains a list of all the downed communication towers 802 in the displayed area. A unique number such as cascade ID may identify each of the downed communication towers. The user may select a specific tower of interest from the list 802 and press an OK button 803. The geospatial map viewer 401 will zoom into the particular service coverage area 815 that contains the selected downed tower.

Advantageously, the user can readily locate the service coverage area where the selected downed tower is located. Although communication towers are used to illustrate the advantage of the Find Current Fault tool button 804, someone of ordinary skill in pertinent art will appreciate that the same functionality may be used to locate other types of troubled element in a communication network.

Figure 9:
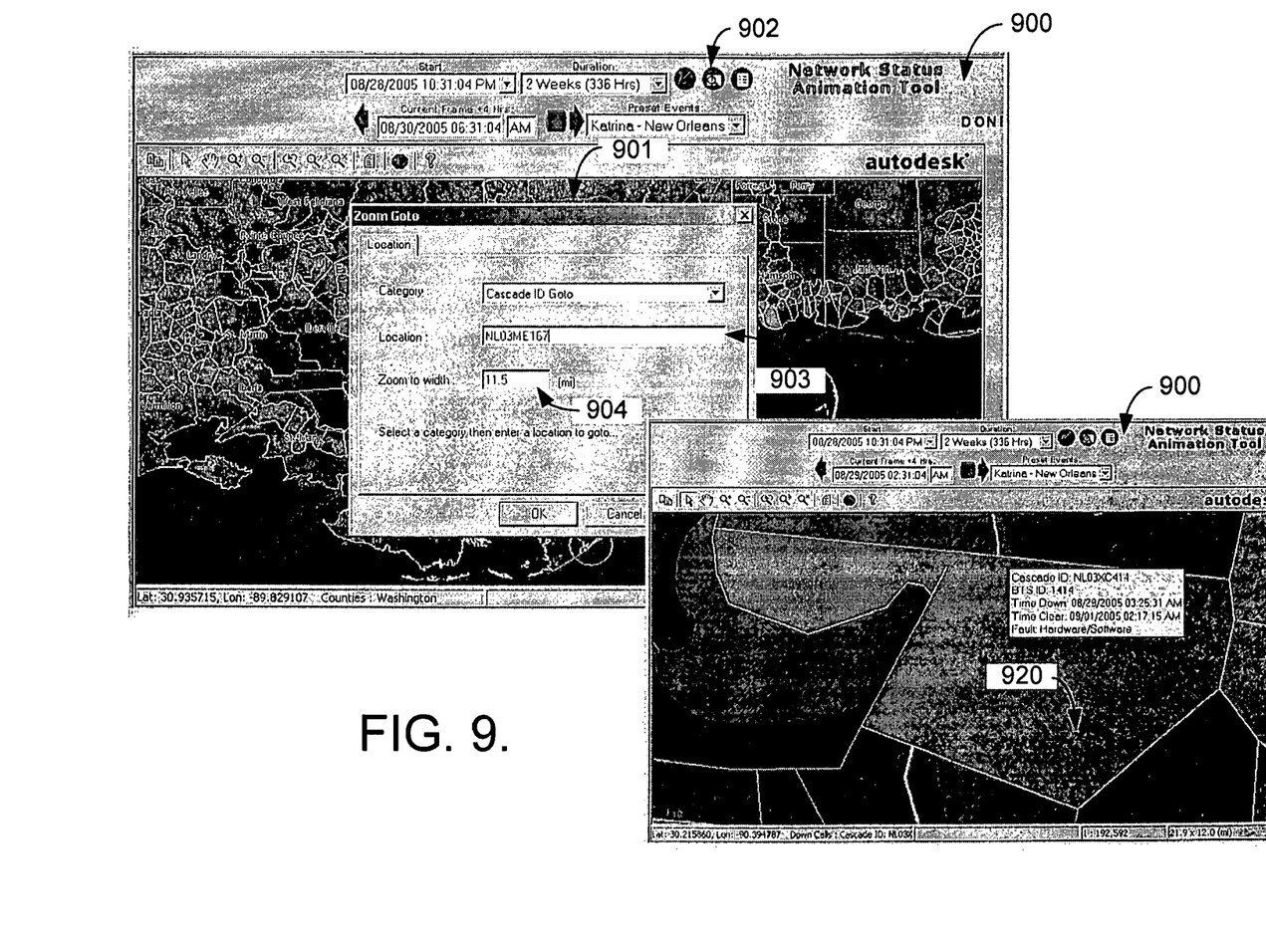
FIG. 9 is a screen shot for a dialog window that appears when a user presses "Locate Map Object" tool button.

FIG. 9 illustrates how the Locate Map Object tool button 902 may help a user zoom into a specific city of the user's interest. The user may wish to zoom into a specific city area from the initial screen 600 as shown in FIG. 6. The user may also wish to zoom further into the specific city area after zooming into a more specific area of interest first as shown in screen 900 from the initial screen 600. For instance, the user may wish to find the network status of a city area where a tropical storm has struck recently. When the user presses the Locate Map Object button 902, a Zoom Goto dialog window 901 pops up. The Zoom Goto dialog window 901 has two text boxes, which are a Location text box 903 and a Zoom to width text box 904.

The user may enter either the full name of a city or just a partial name of the city with one or more wild card characters (e.g., a star character) into the Location text box 903. The user may also specify how close the user wishes the geospatial map viewer 401 to zoom into the selected city area by entering a desired number of miles as the zooming width into the Zoom to width text box 904. If the user enters the full name of the city, the geospatial map viewer 401 will zoom into the city area within the specified width to show a screen 900 that now contains one or more service coverage areas 920 that cover the specified city. If, on the other hand, the user enters only a partial name of the city and one or more wild card characters, the Zoom Goto dialog window 901 will display a list of all the cities that match the partial name. For instance, if the user enters "Kansas*" the Zoom Goto dialog window 901 will display "Kansas City, Mo." among other cities that match the partial name. When the user selects one particular city out of the list, the geospatial map viewer 401 will zoom into the selected city area. Advantageously, the user can zoom quickly into a city area that the user may not be geographically familiar with at all.

Figure 10:
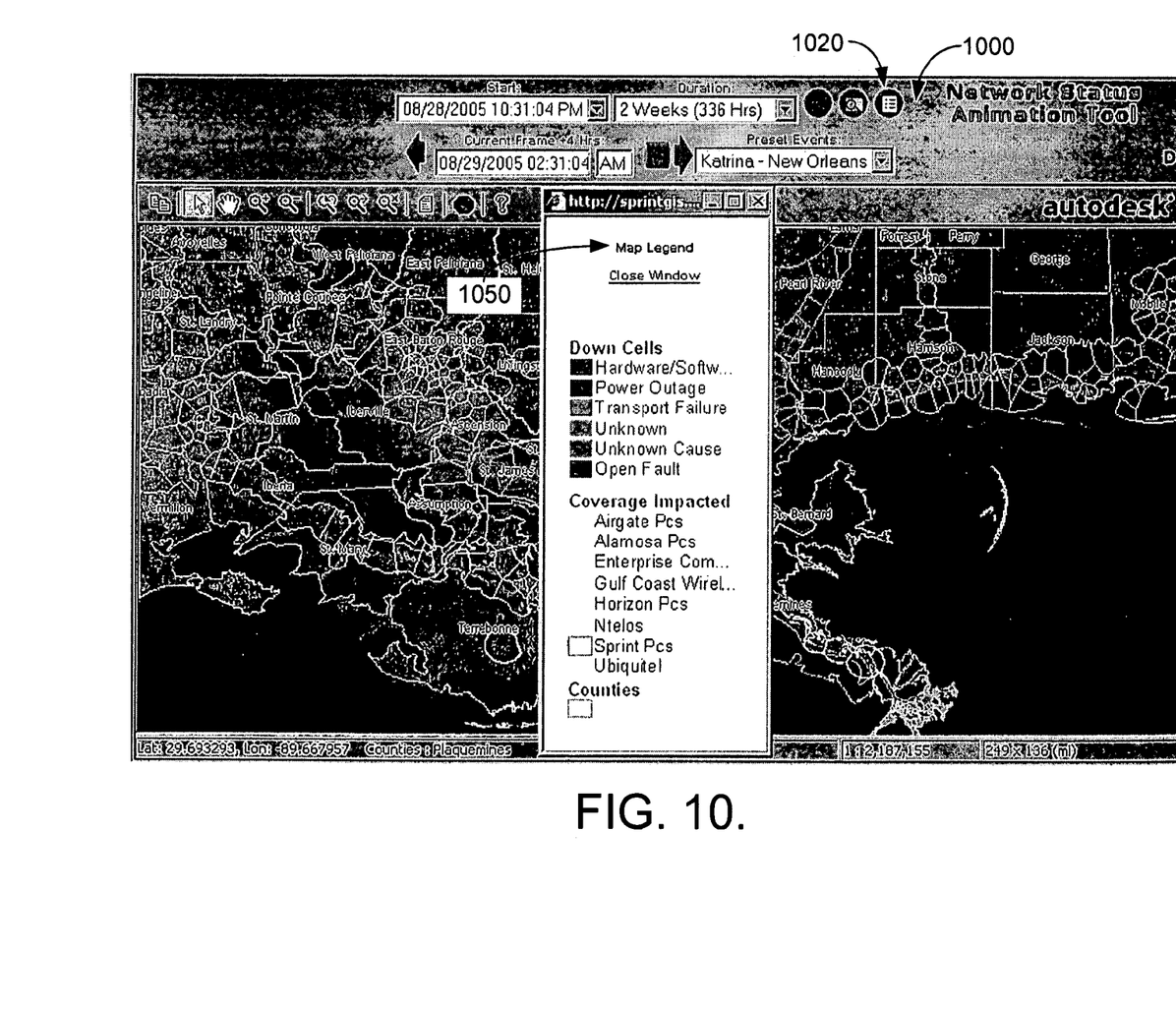
FIG. 10 is a screen shot for a dialog window that appears when a user presses "View Legend" tool button.

FIG. 10 illustrates how the View Legend tool button 1020 may help a user better understand the displayed network status information. Service coverage areas that contain one or more failed equipments are painted with different colors or shades. Different colors or shades may be used to indicate different causes of equipment failures. After zooming into a more specific area of interest as shown in screen 1000, the user may wish to learn what each of the different colors or shades means. When the user presses the View Legend tool button 1020, a Map Legend dialog window 1050 pops up. The Map Legend dialog window 1050 shows a list of the different colors or shades and short texts that explain what each color or shade means. Advantageously, the full screen of a web browser may be devoted to showing maps containing the service coverage areas of the user's interest without yielding precious space to a map legend. Advantageously, the user can bring out the map legend dialog window 1050 only when it is necessary to view the map legend.

As can be seen, the present invention and its equivalents are well-adapted to provide a new and useful method of creating a wireless network geographical animation. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the order described.

The invention claimed is:

1. Computer-readable media having a set of components embodied thereon that make up a network-management system, the set of components comprising:

a first database embodied on the computer-readable media and having a first interface for receiving status information of a plurality of distinctly located network elements from a client in order to maintain a record of the status information of said plurality of distinctly located network elements, and storing said record, wherein the distinctly located network elements include a base transceiver station (BTS), and wherein the status information describes a functional status of at least one of the distinctly located network elements, the functional status comprising the distinctly located network element being operational, non-operational, or experiencing one or more failures;

a second database having a second interface adapted to enable a user to access said record to obtain the status information for a plurality of instances, and storing geospatial information that is associated with said plurality of distinctly located network elements, wherein said plurality of instances occur at evenly spaced time intervals, and wherein the second database receives the status information for said plurality of instances from said first database; and a geographical viewer that accesses the status information and said geospatial information for said plurality of instances to create a graphical animation by sequentially displaying an indication of the functional status of at least one of the distinctly located network elements based on the status information for each instance in said plurality of instances, wherein said geospatial information informs said graphical animation.

2. The media of claim 1 wherein said first database is a relational database.

3. The media of claim 1 wherein said second database is a geospatial database.

4. The media of claim 1 wherein said geospatial information includes polygons.

5. The media of claim 1 wherein said second user interface is a web browser.

6. The media of claim 1 wherein said first database and said second database are related by a common piece of information.

7. The media of claim 6 wherein said common piece of information comprises the identification of a network element.

8. The media of claim 1 wherein said client is a human.

9. The media of claim 1 wherein said client is an automated client.

10. The media of claim 9 wherein said automated client is a ticketing system.

11. One or more computer-readable media, having computer-usable instructions embodied thereon for performing a method of managing a network using a geospatial database and a ticket database, the method comprising:

receiving a first status information regarding a plurality of distinctly located network elements from said ticket database, and storing said first status information in said geospatial database at a first time, wherein said ticket database stores status information that includes error messages that provide an indication of a change in a functional status of one or more of the network elements;

geographically displaying said first status information at said first time;

receiving a second status information regarding said plurality of said network elements from said ticket database, and storing said second status information in said geospatial database at a second time; and geographically displaying said second status information at said second time, wherein the first and second status information describe a functional status of at least one of the network elements.

12. The media of claim 11, said method further comprising:

receiving a third status information regarding said plurality of said network elements from said ticket database, and storing said third status information in said geospatial database at a third time; and geographically displaying said third status information at said third time.

13. The media of claim 12 wherein said method further comprises:

animating a network event by graphically displaying said first, second, and third status information at said first, second, and third times.

14. The media of claim 13 wherein said animating step in said method further comprises:

using said first time as a start time; and using said third time as an end time.

15. The media of claim 11 wherein said method further comprises:

enabling a user to select said network elements from a wireless communications network in a particular geographic area.

16. The media of claim 11 wherein said method further comprises:

enabling a user to search for and choose the name of a city; and geographically displaying the status information of a plurality of distinctly located network elements within the service coverage areas of the city.

17. The media of claim 11 wherein the said first, second, and third status information include software and hardware malfunction information.

18. The media of claim 11 wherein the said first, second, and third status information include transport-failure information.

19. The media of claim 11 wherein the said first, second, and third status information include power outage information.

20. The media of claim 11 wherein the said first, second, and third status information include an indication that the cause of one or more failures is unknown.

* * * * *